United States Patent
Vallee et al.

(12)

(10) Patent No.: US 6,280,882 B1
(45) Date of Patent: Aug. 28, 2001

(54) ELECTROLYTIC COMPOSITION WITH POLYMER BASE FOR ELECTROCHEMICAL GENERATOR

(75) Inventors: Alain Vallee, Varennes; Michel Armand, Montreal; Yves Choquette; Andre Belanger, both of Sainte-Julie; Michel Gauthier, La Prairie; Michel Perrier, Montreal; Karim Zaghib, Longueuil; Estelle Potvin, Saint-Bruno; Simon Besner, Coteau-du-Lac, all of (CA)

(73) Assignees: Hydro-Quebec, Montreal (CA); National de la Recherche Scientifique, Paris (FR)

( * ) Notice: Subject to any disclaimer, the term of this patent is extended or adjusted under 35 U.S.C. 154(b) by 0 days.

(21) Appl. No.: 09/142,055

(22) PCT Filed: Jan. 19, 1998

(86) PCT No.: PCT/CA98/00018

§ 371 Date: Dec. 14, 1998

§ 102(e) Date: Dec. 14, 1998

(87) PCT Pub. No.: WO98/32183

PCT Pub. Date: Jul. 23, 1998

(30) Foreign Application Priority Data

Jan. 17, 1997 (CA) .................................................. 2195387
Nov. 24, 1997 (CA) .................................................. 2221985

(51) Int. Cl.$^7$ .................................................... H01M 6/14
(52) U.S. Cl. .......................... 429/303; 429/300; 429/309; 429/317; 429/315; 429/333; 429/340; 252/62.2
(58) Field of Search .................................. 429/306, 307, 429/309, 312, 315, 330, 333, 337, 338, 340, 300, 303, 317; 252/62.2

(56) References Cited

U.S. PATENT DOCUMENTS 5,290,644 * 3/1994 Andrieu .............................. 429/129
5,463,179 * 10/1995 Chaloner-Gill et al. ............. 429/192

* cited by examiner

*Primary Examiner*—Laura Weiner
(74) *Attorney, Agent, or Firm*—Oblon, Spivak, McClelland, Maier & Neustadt, P.C.

(57) ABSTRACT

The invention concerns an aprotic electrolytic composition located in the separator and in at least one composite electrode containing a powder of an active electrode material, and if necessary an electronic conduction additive of an electrochemical generator The electrolytic composition comprises a first polymer matrix consisting of a polyether and at least a second polymer matrix, macroscopically separated, and also at least an alkaline salt as well as a polar aprotic solvent: The polymer matrices are capable of being swollen by at least one of the polar aprotic solvents. The solvent or mixture of solvents is unevenly distributed between the polymer matrices. The invention also concerns an electrochemical generator comprising a negative electrode and positive electrode reversible to alkaline ions and a separator with polymer electrolyte, the electrolytic component of which is the composition described above. The invention further concerns the manufacture in two or three steps of a sub-assembly of an electrochemical generator by coating an electrode support with a composite electrode containing the second matrix, followed by a surface coating on the electrode resulting from the preceding step with a solution containing the first polymer matrix so as to form the separator wholly or partly.

34 Claims, 3 Drawing Sheets

FIG_2

ELECTROLYTIC COMPOSITION WITH POLYMER BASE FOR ELECTROCHEMICAL GENERATOR

TECHNICAL FIELD

The present invention concerns electrolytic compositions based on polymers, for electrochemical generators. More specifically, the invention is directed to aprotic electrolytic compositions characterized in that they consist of at least one alkali metal salt and a polymer matrix consisting of a polyether and at least another polymer matrix, which are separated microscopically, and are swollen by means of at least one polar aprotic organic solvent said solvent or mixture of solvents being unequally distributed between the matrices.

PRIOR ART

During the last ten years, lithium batteries of the primary and rechargeable type have been tie object of a considerable number of research and development works. The intent was to develop a battery which is safe, inexpensive, having a large energetic content and good electrochemical performances. In this context, a plurality of a battery designs were developed to meet different applications, such as microelectronics, telecommunications, portable computers and electrical vehicles, to name only a few.

Electrochemical batteries or generators, whether rechargeable or not, are all made of an anode which can consist of a metal such as lithium, or an insertion compound which is reversible towards lithium, such as carbon, a cathode which consists of an insertion compound which is reversible towards lithium such as cobalt oxide, a mechanical separator placed in between the electrodes and an electrolytic component. The term electrolytic component means any material placed inside the generator and which is used as ionic transport except electrode materials in which the ions $L^+$ may be displaced at the level of the separator as well as in at least one composite electrode. During the discharge or charge of the generator, the electrolytic component ensures the transport of ionic species through the entire generator from one electrode to the other and even inside the composite electrodes. In lithium batteries, the electrolytic component is generally in the form of a liquid which is called liquid electrolyte or a dry or gel polymer matrix which may also act as mechanical separator.

When the electrolytic component is in liquid form, it consists of an alkali metal salt which is dissolved in an aprotic solvent. In the case of a lithium generator, the more common salts are $LIPF_6$, LiBF4 and $LiN(SO_2CF_3)_2$ and the polar aprotic solvents may be selected from propylene carbonate, ethylene carbonate, γ-butyrolactone and 1,3-dioxolane or their analogs to name only a few. At the level of the separator, the liquid electrolyte is generally impregnated in a porous polymer matrix which is inert towards the aprotic solvent used, or in a fiberglass paper. The use of a liquid electrolyte which is impregnated in an inert polymer matrix enables to preserve a sufficient ionic mobility to reach a level of conductivity of the order of $10^{-3}$ Scm$^{-1}$ at 25° C. At the level of the composite electrodes, when the latter are made of an insertion material which is bound by a polymer matrix which is towards aprotic solvents, which have only little interaction with the latter, the liquid electrolyte compensates for the porosity of the electrode. Examples of batteries utilizing a liquid electrolytic component are found U.S. Pat. No. 5,422,203; U.S. Pat. No. 5,626,985 and U.S. Pat. No. 5,630,993.

When the electrolytic component is in the form of a dry polymer matrix, it consists of a high molecular weight homo or copolymer, which is cross-linkable or non cross-linkable and includes a heteroatom in its repeating unit such as oxygen or nitrogen for example, in which an alkali metal salt is dissolved such as $LiN(SO_2CF_3)_2$, $LiSO_3CF_3$ and $LiClO_4$. Polyethylene oxide is a good example of a polymer matrix which is capable of solving different alkali metal salts. Armand, in U.S. Pat. No. 4,303,748 describes families of polymers which may be used as electrolytic component in lithium batteries. More elaborated families of polymers (cross-linkable or non cross-linkable copolymers and terpolymers) are described in U.S. Pat. Nos. 4,578,326; 4,357,401; 4,579,793; No. 4,758,483 and in Canadian Patent No. 1,269,702. The use of a high molecular weight polymer enables to provide electrolytes in the form of thin films (of the order of 10 to 100 μm) which have sufficiently good mechanical properties to be used entirely as separator between the anode and the cathode while ensuring ionic transport between the electrodes In the composite, the solid electrolyte serves as binder for the materials of the electrode and ensures ionic transport through the composite. The use of a cross-linkable polymer enables to utilize a polymer of lower molecular weight, which facilitates the preparation of the separator as well as the composite and also enables to increase the mechanical properties of the separator and, by the same token, to increase its resistance against the growth of dendrites when using a metallic lithium anode. Contrary to a liquid electrolyte, a solid polymer electrolyte cannot escape nor be evaporated from the generator. Its disadvantage results from a lower ionic mobility obtained in these solid electrolytes which restricts their uses at temperatures between 60 and 100° C.

The gel electrolytic component is itself generally constituted of a polymer matrix which is solvating or non-solvating for lithium salts, aprotic solvent and an alkali metal salt being impregnated in the polymer matrix. The most common salts are $LiPF_6$, $LiBF_4$ and $LIN(SO_2CF_3)_2$ and the polar aprotic solvents may be selected from propylene carbonate, ethylene carbonate, butyrolactones and 1,3-dioxolane, to name only a few. The gels may be obtained from a high molecular weight homo or copolymer which is cross-linkable or non cross-linkable or from a cross-linkable homo or copolymer. In the latter case, the dimensional stability of the gel is ensured by cross-linking the polymer matrix. Polyethers including cross-linkable functions such as alkyls, acrylates or methacrylates are good examples of polymers which may be used in formulating a gel electrolyte, such as described in U.S. Pat. No. 4,830,939. This is explained by their capacity to solvate lithium salts and their compatibility with polar aprotic solvents as well as their low cost, and ease of handling and cross-linking. A gel electrolyte has the advantage of being handled as a solid and of not escaping or going out of the generator as is the case with liquid electrolyte generators. Ionic transport efficiency is associated with the proportion of aprotic solvent incorporated in the polymer matrix. Depending on the nature of the polymer matrix, the salt, the plasticizing agent and its proportion in the matrix, a gel may reach an ionic conductivity of the order of $10^{-3}$ Scm$^{-1}$ at 25° C. while remaining macroscopically solid. As in the case of a dry electrolyte, a gel electrolyte may be used as separator between the anode and cathode while ensuring ionic transport between the electrodes. In the composite electrode(s) of the generator, the gel electrolyte is used as binder for the materials of the electrode(s), and ensues ionic transport through the composite electrode(s). However, the loss of mechanical property resulting from the addition of the liquid phase (aprotic solvent) should generally be compensated by the addition of solid fillers, by cross-linking the polymer matrix whenever possible, or in some cases, when the proportion of liquid is too high, by using a porous mechanical separator which is impregnated with the gel which serves as electrolytic component in the separator. Examples of a generator utilizing a gel electrolytic component are described in U.S. Pat. Nos. 5,443,927 and No. 4,830,939. Takeda et al., in US. Pat. No. 5,658,687 claim a battery and a process of manufacturing said battery which comprises an electrolytic component consisting of a specific, cross-linkable and high molecular weight polyether. This high molecular weight polyether is obtained by esterification of a polyethylene oxide glycol in the presence of acrylic acid or methacrylic acid, sulfonic acid or para-toluenesulfonic acid and an organic solvent The authors mention that the addition of an organic solvent such as a cyclic carbonic ester for example, which means the formation of a gell electrolyte, enables to substantially increase the conductivity of the electrolyte. The electrolytes thus obtained from said polyether can be used as separator, and in the composites, as electrolytic material and as binder for the material of the electrode. In composite electrodes, a second polymer may be added in small proportion to the polyether which is used as electrolyte. Generally, this second polymer is added for the purpose of substantially increasing the mechanical properties of the composite.

The poor resistance of polyethers towards oxidation is however an important problem which is associated with the utilization of solid and gel electrolytes based on polyether as the electrolytic material in a composite cathode in which the voltage in recharge may reach and even exceed 3.5 to 3.7 V. This results in an important loss of capacity of the generator which is caused by the more or less massive degradation of the polymer matrix during consecutive cycles of discharge/charge.

The present invention concerns a new concept of electrolytic component including more than one polymer matrix which is swellable by a liquid electrolyte consisting of at least one aprotic solvent and at least one alkali metal salt, with different amounts of solvents, the matrices being macroscopically separated inside the generator. The rate of differential swelling enables to locally optimize the properties of conductivity such as in composite electrodes and the mechanical properties of the polymer membrane which acts as mechanical separator.

SUMMARY OF THE INVENTION

The present invention concerns an electrolytic component for an electrochemical generator, said electrolytic component consisting of at least two polymer matrices containing at least one alkali metal salt and at least one polar aprotic organic solvent. Said electrolytic component is defined as the electrolytic material which constitutes the separator and the electrolytic material of at least one composite electrode. The polymer matrices are macroscopically separated therein and one of them must be a polyether which is localized wholly or in part in the separator of the generator. The term macroscopic separation means that the polymer matrices are not interpenetrated in the form of microscopic mixtures, such as in an interpenetrated network. The polymer matrices are selected so as to locally optimize the amount of aprotic solvent, in order that the latter be unequally distributed between the polymer matrices. The term swellable polymer matrix means a polymer matrix which can include an amount of aprotic organic solvent which is sufficient to form a gel.

It is shown in the present invention that the use of a separator based on a gel polyether does not limit the power, i.e. the capacity of charge or discharge of the generator as compared to an equivalent generator in which the separator consists of a free liquid solvent included in the pores of an inert porous separator, This comparison obtained by utilizing a cross-linked separator in order to limit the amount of solvent in spite of the use of a polyether matrix which is very compatible with the solvent, enables to optimize the mechanical behaviour of the polymer matrix and to optimize its thinness. On the other hand, and this is one of the advantages of the invention, it is also shown that it is possible and desirable to control the amount of solvent of the polymer matrix or matrices in the composite electrodes preferably with a higher amount of solvent so as to increase the ease of diffusion of alkali metal salt ions, which is generally more limiting in composite electrodes because of the tortuous paths resulting from solid fillers.

A) Similar polymer matrix in the entire separator.

B) Polymer matrix containing more solvent (more swollen) in each composite electrode, Example: Any polyether with control of the amount of cross-linking of the comonomers.

C) Different polymer matrices in the composite electrodes and the separator. Example: To anticipate solvent variations during cycles of discharge/charge.

Example; Polyethers with different cross-linkings or polymers of different nature.

D) Polymer matrix of the separator in two layers so as to make a polyether separator compatible with a 4 V electrode.

Figure 2:
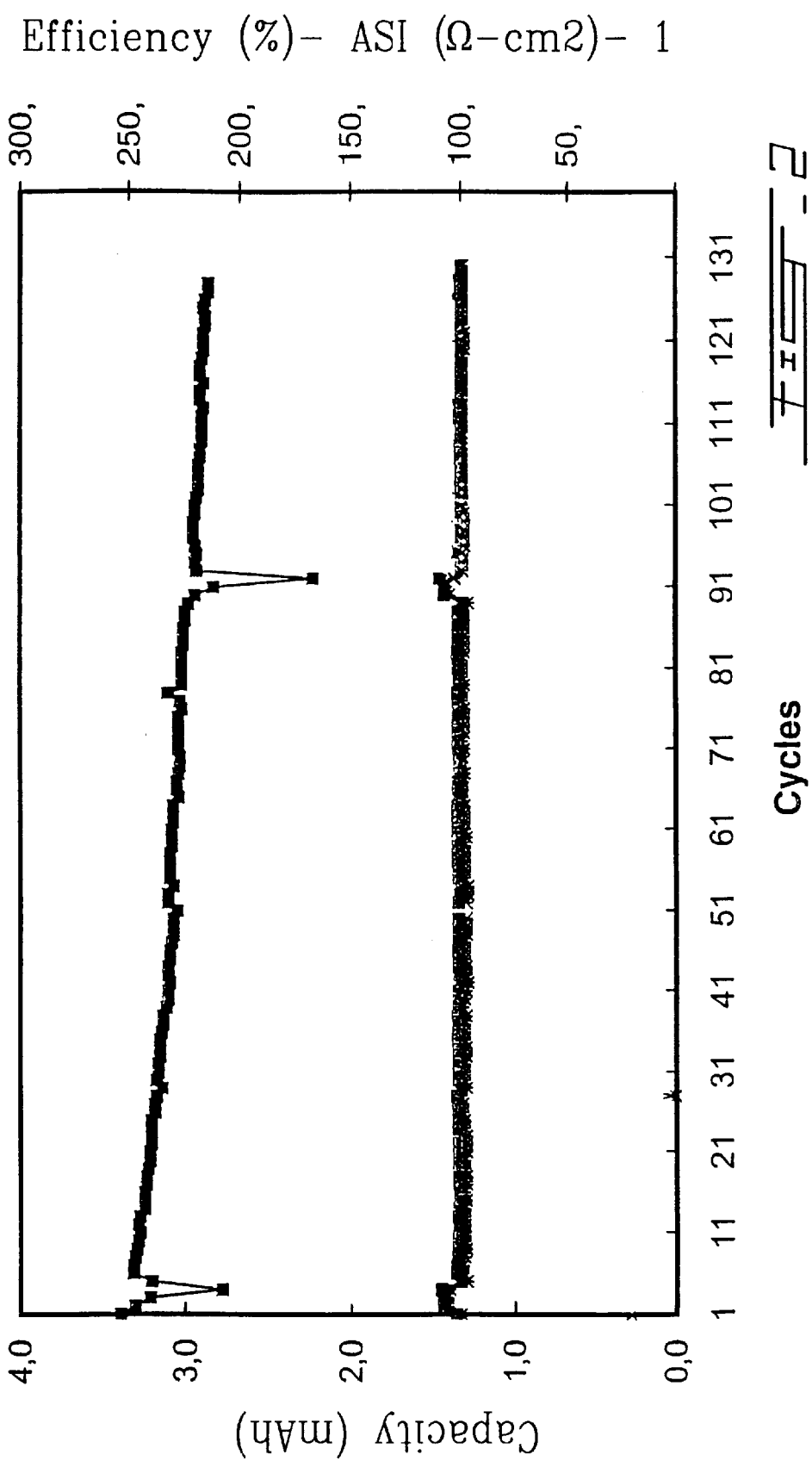

FIG. 2 gives the results of cycling a generator of Example 1.

Figure 3:
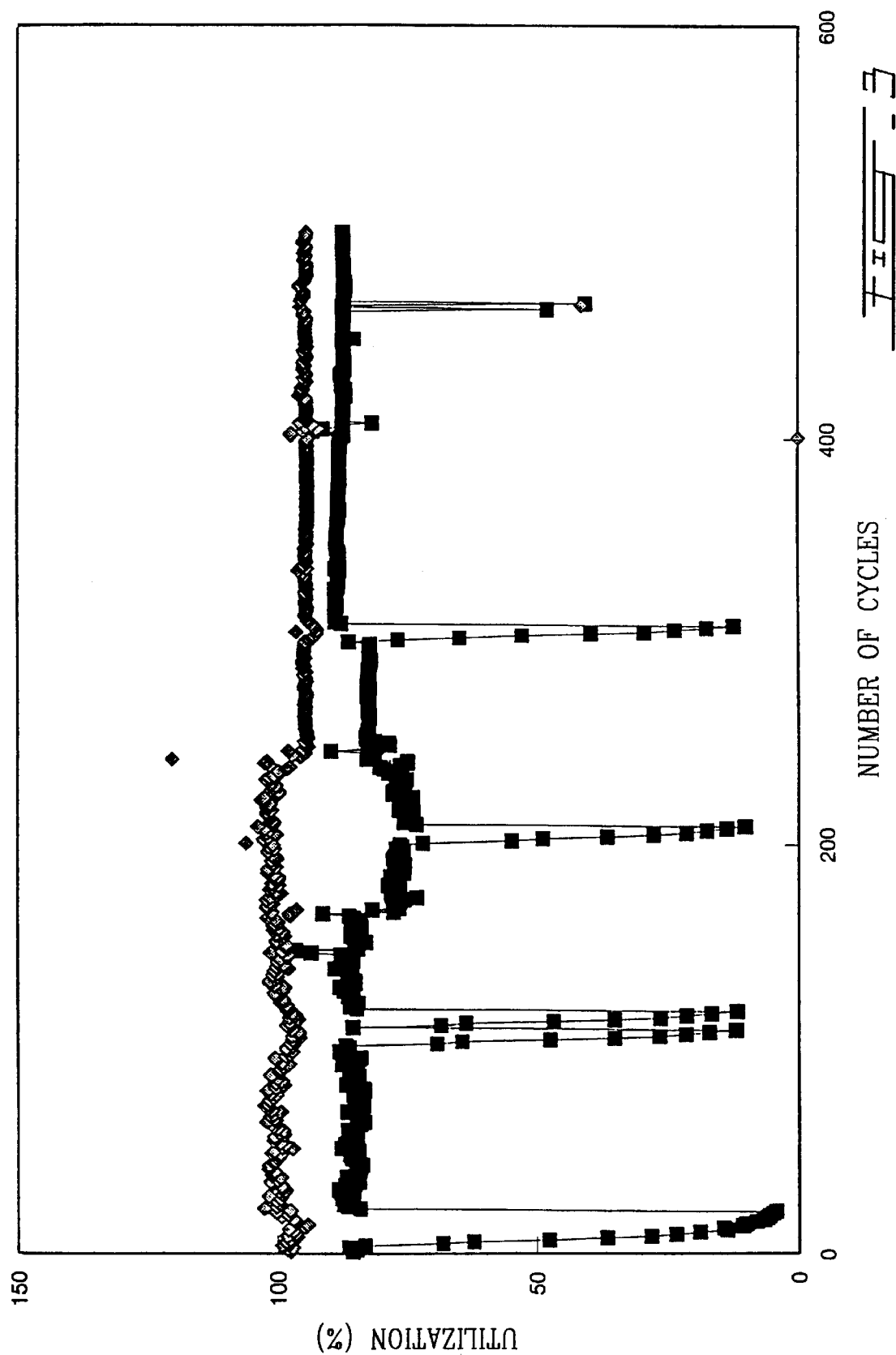

FIG. 3 gives the results of cycling the generator of Example 12.

Figure 1:
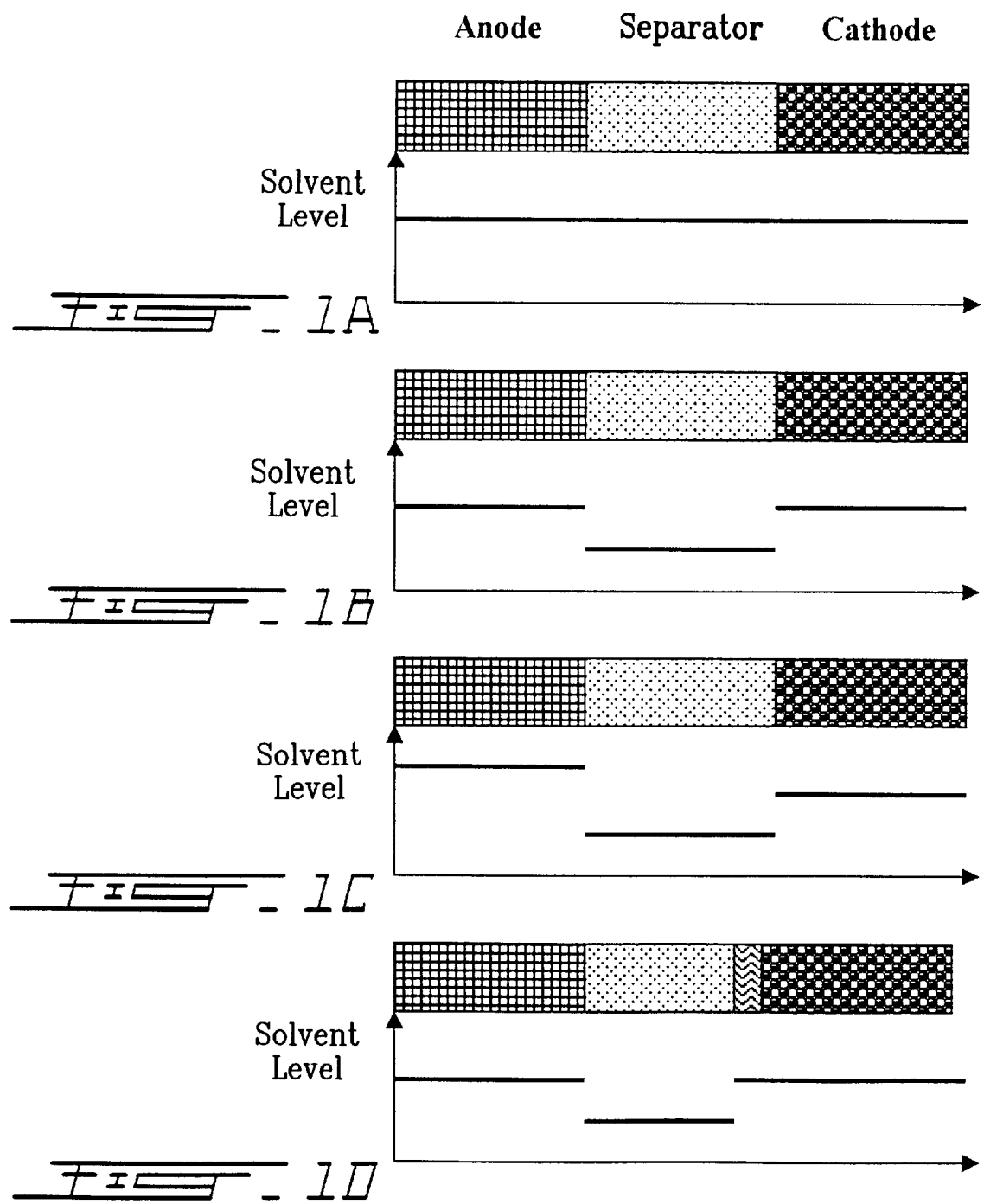
FIG. 1 schematically illustrates generators with double composite electrodes (non-limiting) in four embodiments of the invention.

Embodiments which account for this teaching are schematically illustrated in FIG. 1.

It will be remembered that the high amount of swelling of the polymer matrix of the composite electrode may be obtained by utilizing, in the case of an all polyether system, a non cross-linkable or little cross-linked polyether.

An alternative way of obtaining a high amount of solvent in composite electrodes consists inter alia of using a polymer matrix which is only slightly swollen and compensating for the porosity of the composite by a free liquid phase. This embodiment will be preferred for preparing high voltage cathodes ≧4 V or still for giving a larger power capacity to a cathode of 3 V or more such as $LiFePO_4$ or its analogous polyanions.

Strictly as an illustration, but without limitation, these types of optimization of generators including gels, could be interpreted by considering that:

the cationic transport number of the electrolytes containing lithium salts in polar aprotic medium is not 1, but lower than that. This phenomenon results in gradients of salt concentration that it is sometimes difficult to resorb in composite electrodes during rapid discharges or charges. The present invention intends to reduce the effect of this phenomenon;

transport of alkali cations is accompanied by a movement of its solvating sphere when a liquid solvent or a low molecular weight polymer is used. Therefore, it is possible to provide for a decrease or an increase of the amount of liquid solvent in composite electrodes. The present invention tends to reduce the effect of this phenomenon and to optimize the performances of the generator.

The alkali metal salt(s) may be lithium, sodium, potassium salts or others such as for example salts based on lithium trifluorosulfonimide described in U.S. Pat. No. 4,505,997, cross-linkable or non crosslinkable lithium salts derived from bisperhalogenoacyl or sulfonylimide described in U.S. Pat. No. 4,818,644 and in PCT WO 92/02966, $LIPF_6$, $LiBF_4$, $LiSO_3CF_3$, $LiClO_4$, $LiSCN$, $NASCN$, $NaClO_4$, $KSCN$ and $KClO_4$, etc. The nature of the salt is not a limitation of the present invention.

The polar aprotic solvent(s) may for example be selected from propylene carbonate, ethylene carbonate, ethyl methyl carbonate, dimethyl ethyl carbonate, tetrahydrofurane, 2-methyltetrahydrofurane, 1,3-dioxolane, 4,4-dimethyl-1,3-dioxolane, γ-butyrolactone, butylene carbonate, sulfolane, 3-methylsulfolane, tert-butyl-ether, 1,2-dimethoxyethane, 1,2-diethoxyethane, bis(methoxyethyl)ether, 1,2-ethoxymethoxyethane, tertbutylmethylether, glymes and sulfamides of formula; $R_1R_2N-SO_2-NR_3R_4$, in which $R_1$, $R_2$, $R_3$ and $R_4$ are alkyls having between 1 and 6 carbon atoms and/or oxyalkyls having between 1 and 6 carbon atoms. The nature of the solvent is not a limitation of the present invention.

The active material of the cathode may be selected from cobalt oxide, nickel oxide, nickel cobalt oxide, nickel cobalt aluminum oxide, manganese oxide ($LiMn_2O_4$) or their analogs for so-called 4 V cathodes or among cathodes of less hand 4 V such as phosphates or other polyanions of transition metals such as $LiFePO_4$, Nasicon structures also including $V_2O_5$, $LiV_3O_8$ and $MnO_2$. The nature of the active material is not a limitation of the present invention.

The active material of the anode may be selected from lithium metal or a metallic alloy based on lithium such as lithium-aluminum or lithium-tin or a carbon or another low voltage insertion compound capable of inserting lithium. The nature of the active material is not a limitation of the present invention.

The conductive gels of the invention also comprise gels formed of polymers which are low solvating for lithium salts or are low intrinsic conductors in the presence of salts but including heteroatoms such as fluorine or polar groups such as nitriles, sulfonates, fluoromethanes, which makes them miscible with one or more polar aprotic organic solvents. The latter then give to the gel solvating properties of lithium salts so as to enable them to act as electrolytic component The main low solvating polymers may be, by way of non-limiting examples, PVDF or copolymers thereof; polyacrylonitriles and polyelectrolytes including sulfonate or fluorosulfonate groups or their equivalents.

EMBODIMENTS OF THE INVENTION

Embodiment 1

In a first embodiment, the electrolytic component consists of two polar matrices of different chemical nature, swollen at different rates by at least one polar aprotic solvent containing at least one alkali metal salt.

The first polymer matrix which mainly constitutes the separator consists of a polyether (polymer #1) in the form of a high molecular weight homo or copolymer, which is cross-linkable or non cross-linkable, or a low molecular weight cross-linkable homo or copolymer. The matrix may contain at least one cross-liking additive in order to increase the dimensional stability of the formed separator and especially help in limiting the rate of swelling. The cross-linking additive is selected from trimethylolpropane, trimethacrylate, polyethylene oxide diacrylate, polyethylene oxide dimethacrylate, glycerol triacrylate, glycerol trimethacrylate, pentaerythiol tetraacrylate, glycerol propoxylate (1PO/OH) triacrylate, dipentaerythiol penta/hexaacrylate and di(trimethylolpropane) tetraacrylate. The matrix may also contain a cross-linking initiator. Cross-linking of the matrix is carried out thermally, by UV radiation or with an electron beam (EB). The amount of aprotic solvent contained in the matrix is determined by the chemical nature of the polyether, its compatibility with the aprotic solvent and its degree of cross-linking. For the separator, it is interesting to have an amount of aprotic solvent which is more limited knowing that the diffusion is less limiting than in composite electrodes and knowing that the mechanical properties decrease with the increase of the amount of aprotic solvent.

The second polymer matrix is mainly used in the composite electrode(s) and in certain cases in the part which is adjacent to the electrodes, for example in the vicinity of the composite cathode. The macroscopic separation of the two polymer matrices is generally localized at the interface between the composite electrode(s) and the separator. The second polymer matrix consists of a cross-linkable or non cross-linkable high molecular weight homo or copolymer (polymer #2) which is not necessarily a polyether and which may be selected for its resistance to oxidation when included in a so-called 4 V cathode, such as: $LiCoO_2$, $LiMnO_2$ and $LiMn_2O_4$. The amount of aprotic solvent in the matrix is determined by the chemical nature of polymer #2, its degree of cross-linking and the chemical nature of the aprotic solvent used. Polymer #2 is preferably used in a proportion comprised between 5 and 20 weight percent of the composite electrode. Polymer #2 simultaneously serves as binder for the active material of the electrode and to isolate the active material of the remainder of the electrolytic component. It should also be electrochemically stable towards the material of the electrode in which it is included, the use of a polyether matrix being restricted to the materials of the electrode in which the voltage on recharge does not exceed 3.5 to 3.7 V. The composite may be obtained by way of example by coating in solvent phase on a current collector with a solution in which the material of the electrode is dispersed and wherein polymer #2 is dissolved The electrode may also be obtained in other ways such as by extrusion, serigraphy, etc. In a non-limiting embodiment, the introduction of the aprotic solvent and of the alkali metal salt in the composite electrode is carried out immediately before the latter is assembled with the separator or after having been assembled with the separator either in the form of a half-battery, or in the form of a complete generator.

This procedure for the introduction of the aprotic solvent and the alkali metal salt in the electrode during a stop which follows that of the production of the composite electrode has two advantages. The electrode may be prepared and stored under conditions which require no specific control of the atmosphere and the rate of humidity, provided a drying step is carried out immediately before its use. In addition, steps are taken to provide an intimate and optimum contact between the material of the electrode and polymer #2 so as to maxim the coating of the material of the electrode. The coating of the material of the electrode minimizes direct contacts of the latter with the polyether at the interface between the separator and the composite electrode.

The chemical nature of polymer #2 is selected so as to constitute a gel with the polar aprotic solvent. The amount of swelling should not be too important so as to preserve electrical percolation in the composite electrode or should be fixed when coating is produced, if possible. Mixtures of aprotic solvents comprising ethyl methyl carbonate and ethyl carbonate $LiPF_6$ 1 molar with a vinyldiene-co-hexafluoropropene copolymer (PVDF-HFP) and a mixture of solvents comprising tetramethylsulfonamide and ethyl carbonate $LiPF_6$ 1 molar with an ethylene propylene diene copolymer (EPDM) are two examples of aprotic solvent polymer couples as previously described. With a small amount of swelling, the remaining porosity in the composite electrode is later compensated by the aprotic organic solvent in which the alkali metal salt(s) is dissolved.

Embodiment 2

The second embodiment of the electrolytic component is different from embodiment #1 only by the composition of the matrix constituting the separator, in that the polymer matrix of the latter may be formed of a network which is interpenetrated by the addition of a third cross-linkable polymer which is solvating or non-solvating or thus forms a semi-interpenetrated network by the addition of the third polymer. The third polymer is not necessarily a polyether and is used in a volume proportion lower than that of polymer #1.

In the present invention, it is preferred to use a polyether in the major part of the generator because of its electro-chemical and technological advantages as conductive binder and as cross-linkable separator. Gels formed of non-solvating polymer are preferably used mainly in the composites and especially in the cathode where resistance to oxidation becomes critical and may limit the use of polyethers alone when the cathodes operate at voltage of recharge beyond 3.5 to 3.7 V.

Embodiment 3

In a third embodiment the electrolytic component is identical to that of embodiment #1 except that the porosity which remains in the composite electrode(s) is compensated by a polyether matrix which is swollen by at least one aprotic solvent containing at least one alkali metal salt. In this case, the proportion of aprotic solvent is lower in the polyether of the separator than in the polyether which is present in the composite so as to optimize the diffusion of ions in the composite while minimizing the contact surface between the polyether and the active material of the cathode, for example in the case of 4 V cathodes.

Embodiment 4

In a fourth embodiment, the electrolytic component consists of two polyether based matrices swollen at different degrees by at least one polar aprotic solvent containing at least one alkali metal salt.

In the cases where cathodes operating at recharge voltages lower than 3.5–3.7 V are used, all polyether generators will be preferred by then relying on the amount of cross-linking so as to control the amount of aprotic solvent which is present in the polyether of the separator and the amount of polyether which is present in the composite electrodes. A higher amount of aprotic solvent will be sought in composite electrodes so as to maximize therein the diffusion of ions during rapid charge or discharge.

The first polymer (matrix #1) which constitutes the separator consists of a polyether in the form of a cross-linkable homo or copolymer. The matrix may contain at least one cross-linking additive in order to increase the dimensional stability of the separator obtained and to control its rate of swelling. The cross-linking additive may be selected from trimethylolpropane triacrylate, trimethylolpropane trimethacrylate, polyethylene oxide diacrylate, polyethylene oxide dimethacrylate, glycerol triacrylate, glycerol trimethacrylate, pentaerythiol tetraacrylate, glycerol propoxylate (1PO/OH) triacrylate, dipentaerythiol penta/hexaacrylate and di(trimethylolpropane) tetraacrylate. The matrix may also contain a cross-linking initiator. Cross-linking of the matrix may be carried out thermally, by UV radiation or with an electron beam (EB). The amount of aprotic solvent in the matrix is determined by the chemical nature of the polyether, its cross-linking degree and the chemical nature of the aprotic solvent used.

The second polymer (matrix #2) is included in the composite electrode(s). The macroscopic separation of the two polymer matrices is localized at the interface between the composite electrode(s) and the separator or near the interface of the cathode which is then selected from cathodes in which the voltage on recharge is below 3.5 to 3.7 V such as one based on $LiFePO_4$ by way of non-limiting example. The second polymer matrix consists of a polyether in the form of a high molecular weight cross-linkable or non cross-linkable homo or copolymer, or a lower molecular weight cross-linkable homo or copolymer. The polyether matrix simultaneously serves as binder for the active material of the electrode and as electrolytic component to ensure ionic transport in the composite electrode(s). The matrix may contain at least one cross-linking additive to increase the dimensional stability of the separator formed and to control its cross-linking degree. The cross-linking additive is selected from trimethylolpropane triacrylate, trimethylolpropane trimethacrylate, polyethylene oxide diacrylate, polyethylene oxide dimethacrylate, glycerol triacrylate, glycerol trimethacrylate, pentaerythiol tetraacrylate, glycerol propoxylate (1PO/OH), dipentaerythiol penta/hexaacrylate, and di(trimethylolpropane) tetraacrylate. The matrix may also contain a cross-linking initiator. Cross-linking of the matrix may be carried out thermally, or by electron beam radiation (EB). However, in the composite electrode the amount of aprotic solvent present in the matrix is in this case higher than in the matrix of the separator so as to influence the diffusion of ions in the composite electrodes. The amount of aprotic solvent present in the matrix is then fixed by the chemical nature of the polyether, its cross-linking degree and by the chemical compatibility of the aprotic solvent used with the polyether matrix.

Embodiment 5

This embodiment concerns the preparation of a polyether based matrix, in swollen form, which constitutes the separator. The mixture of polyether with at least one aprotic organic solvent and at least one alkali metal salt is formed into a thin film on a peelable support or directly on one of the electrodes of the generator by a known method of coating with solvent by utilizing, if needed, a liquid solvent which is volatile and chemically compatible with the components of the generator, or by extrusion. For mixtures of a polyether of lower molecular weight with one or more aprotic organic solvents, which are in liquid form at the spreading temperature, the coating may then be carried out in the absence of a coating solvent. During this step of preparation, the polyether based mixture may contain at least one cross-linking additive, at least one alkali metal salt and a cross-linking initiator. Cross-linking of the matrix is carried out thermally, by UV radiation or with an electron beam (EB). The separator is thus obtained in swollen state with at least one aprotic organic solvent which may or may not contain an alkali metal salt and is ready to be used in assembling a generator.

Embodiment 6

This embodiment concerns the production of the polyether based matrix which constitutes the separator. The polyether is formed into a thin film on a peelable support by a known method of coating with a solvent or by extrusion. For polyethers of lower molecular weight which are liquid at 25° C., coating may be carried out in the absence of a coating solvent. During this production step, the polyether may contain at least one cross-linking additive, at least one alkali metal salt, and a cross-linking initiator. Cross-linking of the matrix may be carried out thermally, by UV radiation or with an electron beam (EB). The separator thus obtained is swollen with at least one aprotic organic solvent which may or may not contain an alkali metal salt immediately before being used in assembling a generator. A variant of this embodiment is that the aprotic organic solvent of the separator is introduced after assembly by transfer of solvent from one or the composite electrode(s).

Embodiment 7

This embodiment concerns a two-step process of preparation of a sub-assembly of an electrochemical generator from an electrolytic component of the present invention.

The first step consists in coating, in the presence of air, at least one porous composite electrode including a low swellable polymer matrix which acts as binder. This swollen electrode is easy to dry and is slightly hydroscopic so as to simplify this step of assembly of the generator.

The second step consists in overspreading under anhydrous condition on the previously dried porous composite electrode a liquid aprotic solution is comprising a cross-linkable or non cross-linkable polyether which is swellable by means of one or more aprotic organic solvents containing at least one alkali metal salt. If needed, a volatile organic solvent is added to facilitate the operation. At least one cross-linking additive selected from trimethylolpropane triacrylate, trimethylolpropane trimethacrylate, polyethylene oxide diacrylate, polyethylene oxide dimethacrylate, glycerol triacrylate, glycerol trimethacrylate, pentaerythiol tetraacrylate, glycerol propoxylate (1PO/OH) triacrylate, dipentaerythiol penta/hexaacrylate and di(trimethylolpropane) tetraacrylate may also be added. The aprotic solution thus compensates the entire or partial porosity of the composite electrode and constitutes at the surface of the latter the separator as whole or in part The polyether based matrix of the sub-assembly thus obtained may be cross-linked thermally, by UV radiation or with a beam of electrons (EB).

Embodiment 8

This embodiment concerns a process of assembling of a generator, including an electrolytic component of the present invention, by a joining operation carried out by lamination or by pressing two sub-assemblies as described in embodiment 7, i.e. an anodic and a cathodic sub-assembly. In the case where the porosity of one of the two sub-assemblies is only partially compensated, said porosity is compensated after said joining by impregnation with a liquid electrolyte.

Embodiment 9

This embodiment is identical to that of embodiment 8 except that the cathode is a porous electrode or a cathode as described in embodiment 1.

Embodiment 10

This embodiment is identical to that of embodiment 7 except that a polyether based electrolytic separator less than 10 μm thick containing a solid reinforcing filler is inserted between the two assemblies when carrying out said joining.

EXAMPLES

All the examples included in the present patent were carried out in a laboratory. The laboratory means which are used are only intended to illustrate the present invention and are in no case limiting with respect to the present invention. By way of example, use of a separator obtained first in a dry form and thereafter swollen by soaking in a salt solution of the aprotic solvent during the assembly of the generator only constitutes a simplified process for the needs of the laboratory and is not necessarily an interesting technological process.

EXAMPLE 1

It is shown in the first example that the use of a gel polyether based separator does not limit power, i.e. the capacity of discharge or charge of the generator as compared to an equivalent generator in which the separator consists of a free liquid solvent included within the pores of an inert porous separator. This comparison, obtained by utilizing a cross-linked separator so as to limit the amount of solvent in spite of the use of a polymer matrix which is very compatible with the solvent, enables to optimize the mechanical behaviour and to optimize the thinness.

The present example concerns an electrochemical generator including an electrolytic component as described in embodiment 1 except that the separator is prepared in the manner described in embodiment 6 to facilitate the working of the example in the laboratory.

All handlings were carried out in a glove box under an inert and anhydrous atmosphere. A solution A is obtained by dissolving lithium hexafluorophosphate in glycerol-tri[poly (oxyethylene)(oxypropylene)] triacrylate of molecular weight 8,000 so as to give a molar ratio of oxygen over lithium (O/Li) of 30/1. A solution B is obtained by dissolving lithium (O/Li) in commercially available polyethylene oxide glycol dimethacrylate whose molecular weight is 200 (available from Polyscience, USA) so as to give a molar ratio of oxygen over lithium (O/Li) of 30/1. A solution C is obtained by mixing a proportion of each solution A and B. The proportion of solution A and B is adjusted so as to obtain in solution C 70 volume percent of the polymer of solution A and 30 volume percent of the polymer of solution B. 1% by weight (weight of polymers) of the photoinitiator Irgacure-651® (Ciba Geigy) is added.

Solution C is spread in the form of a film 15 μm thick and cross-linked by UV radiation.

An electrochemical generator is prepared by utilizing a negative electrode which contains 90 weight percent graphite and 10 weight percent of a polymer comprising vinyl-diene fluoride co-hexafluoro propene. Said negative electrode has a capacity of 3.56 Coulomb/cm$^2$. The electrode is obtained by coating in solvent phase (acetone) on a copper current collector 16 μm thick so as to give a film 56 μm thick. The separator consists of a polymer membrane such as described in the preceding paragraph (polymer membrane with a thickness of 15 μm containing lithium hexafluorophosphate in a molar ratio O/Li=30). The positive electrode contains a mixture of 91.6 weight percent of cobalt oxide, ($LiCoO_2$), 2.7 weight percent of Shawinigan carbon black and 5.7 weight percent of a vinyldiene fluoride co-hexafluoro propene polymer. Said positive electrode has a capacity of 4.08 Coulomb/cm$^2$. The electrode is obtained by coating in solvent phase (acetone) on an aluminum current collector 8 μm thick so as to give a film 49 μm thick. When assembling the electrochemical generator, the separator is immersed 30 minutes in a mixture of ethyl methyl carbonate and ethylene carbonate (in a molar ratio 1:1) containing lithium hexafluorophosphate at a 1 molar concentration (available from Tomyama) and the cathode and the anode are immersed 10 minutes in a solution of the mixture of solvent ethyl methyl carbonate and ethylene carbonate (in a molar ratio 1:1) containing lithium hexafluorophosphate at a 1 molar concentration (available from Tomyama). The copolymer of vinyldiene fluoride co-hexafluoro propene has a much less important affinity for the aprotic solvent than that of the polyether for the same aprotic solvent. The solvent is therefore distributed unequally between the polyether matrix and the vinyldiene fluoride co-hexafluoro propene matrix. However, in composite electrodes, the aprotic solvent also compensates for the porosity of the electrodes in addition to gelling the copolymer of vinyldiene fluoride co-hexafluoro propene. Therefore, following the immersion, the solvent holds 42% of the volume of the separator, 51% of the volume of the cathode and 45% of the volume of the anode. The electrochemical generator is thereafter rapidly assembled by light pressing at 25° C. of the negative electrode of the separator and the positive electrode and is placed in a sealed bag. Cycling results at 25° C., illustrated in FIG. 2, show a normal cycling of the generator from the point of view of capacity and efficiency (defined as the ratio of a discharge over the subsequent charge) for more than 130 cycles of deep discharge obtained at a constant current discharge Id of 0.14 mA/cm$^2$ and a current of charge of 0.11 mA/cm$^2$, between voltage limits 4.1 V and 2–7 V which corresponds to a discharge in C/6 and a charge in C/8. After 130 cycles of deep discharge, the loss of capacity is 14% which is comparable to a Lithium-Ion Sony battery. After cycle #2 and cycle #90, the current of discharge was increased for three consecutive cycles, corresponding to rates of discharge in C/3, C/2 and C/1, and the results are presented hereinafter.

| | % Capacity Obtained | |
|---|---|---|
| Rate of discharge | After 2 cycles | After 90 cycles |
| C/3 | 97% | 99% |
| C/2 | 95% | 95% |
| C/1 | 82% | 75% |

These results clearly establish that the use of a gel electrolyte containing a small amount of aprotic solvent, near 40% by volume, does not limit the ionic transport in the generator. These results are similar to those obtained from an equivalent generator (similar composite electrodes) utilizing a liquid electrolyte impregnated in a porous separator of the type Celgard containing 40 is volume percent of solvent.

EXAMPLE 2

The present example concerns an electrochemical generator including an electrolytic component such as described in embodiment 3, except that the separator is prepared as in embodiment 6 to facilitate the working of the example in the laboratory.

All handlings were all carried out in a glove box under an inert and anhydrous atmosphere. A solution A is obtained by dissolving lithium hexafluorophosphate in glycerol-tri[poly(oxyethylene)(oxypropylene)] triacrylate in which the molecular weight is 8,000 so as to give a molar ratio of oxygen over lithium (O/Li) of 30/1. A solution B is obtained by dissolving lithium hexafluorophosphate in polyethylene oxide glycol diacrylate which is commercially available and in which the molecular weight is 200 (available from Polyscience, USA) so as to give a molar ratio of oxygen over lithium (O/Li) of 30/1. A solution C is obtained by mixing a proportion of each of solutions A and B. The proportion of solutions A and B is adjusted so as to give in solution C 70 volume percent of polymer of solution A and 30 volume percent of the polymer of solution B.

Solution C is spread in the form of a film 15 μm thick and is cross-linked by irradiation with an electron beam, EB, at 5 Mrad.

An electrochemical generator is manufactured by utilizing a negative electrode which contains 89 weight percent of graphite and 11 weight percent of a polymer consisting of vinyldiene fluoride co-hexafluoro propene. Said positive electrode has a capacity of 1.90 Coulomb/cm$^2$. The electrode is obtained by coating in solvent phase (acetone) on a copper current collector 16 μm thick so as to give a film 30 μm thick. The separator consists of a polymer membrane such as described in the previous paragraph (polymer membrane of a thickness of 15 μm containing lithium hexafluorophosphate in a molar ratio O/Li=30). The positive electrode contains a mixture of 86.1 weight percent of iron phosphate (LiFePO$_4$), 5.8 weight percent of Shawinigan carbon black and 8.1 weight percent of a polymer comprising vinyldiene fluoride co-hexafluoro propene. Said positive electrode has a capacity of 2.18 Coulomb/cm$^2$. The electrode is obtained by coating in solvent phase (acetone) on an aluminum current collector 8 μu thick so as to give a film 41 μm thick. When mounting the electrochemical generator, the separator is immersed for 30 minutes in a solvent mixture of ethyl methyl carbonate and ethylene carbonate (in a molar ratio 1:1) containing lithium hexafluorophosphate at a 1 molar concentration (available from Tomyama). Following the immersion, the solvent represents 42% of the volume of the separator. A solution D containing 50 volume percent of a solvent mixture comprising ethyl methyl carbonate and ethylene carbonate (in a molar ratio 1:1) and lithium hexafluorophosphate at a 1 molar concentration (available from Tomyama) and 50 volume percent of the glycerol tri[poly(oxyethylene)(oxypropylene)] triacrylate polymer is overcoated on the anode and the cathode so as to compensate for the porosity of these two electrodes without leaving an excess at the surface of the electrodes. After having been soaked by overcoating, the negative and positive electrodes are irradiated by an electron beam, EB, at 5 Mrad so as to cross-link the glycerol tri[poly(oxyethylene)oxypropylene)] triacrylate polymer. The copolymer of vinyldiene fluoride co-hexafluoro propene has a much less important affinity for the aprotic solvent than that of polyethers for this same aprotic solvent. The solvent is therefore unequally distributed between the polyether matrices and the vinyldiene fluoride co-hexafluoro propene matrix. Moreover, the polyether matrix used to compensate for the porosity of the composite electrodes contains more aprotic solvent than the polyether matrix used as separator. The electrochemical generator is thereafter rapidly assembled by light pressing the negative electrode of the separator and the positive electrode at 25° C. and is thereafter put in a sealed bag. After forty-seven cycles of deep discharge obtained at a constant current discharge Id of 0.09 mA/cm$^2$ and a charge current of 0.08 mA/cm$^2$, between voltage limits of 4.1 V and 2.7 V there always remains more than 70% of the capacity.

EXAMPLE 3

The present example concerns an electrochemical generator including an electrolytic component as described in embodiment 4 except that the separator is prepared in a manner described in embodiment 6 to facilitate the working of the example in the laboratory.

All handlings were carried out in a glove box under an inert and anhydrous atmosphere. A solution A is obtained by dissolving lithium bis(trifluoromethanesulfonic) in glycerol-tri[(poly(oxyethylene)-(oxypropylene)] triacrylate in which the molecular weight is 8,000 so as to give a molar ratio of oxygen over lithium (O/Li) of 30/1. A solution B is obtained by adding into solution A trimethylolpropane triacrylate (available from Polyscience, USA) in order to give 85 volume percent of polymer from solution A and 15 volume percent of trimethylolpropane triacrylates.

The solution B is spread in the form of a film 15 $\mu$m thick and is cross-linked by irradiation with an electron beam, EB, at 5 Mrad.

An electrochemical generator is manufactured by utilizing a negative electrode which contains 90 weight percent of graphite, 10 weight percent of a polymer comprising glycerol-tri[poly(oxyethylene)(oxypropylene)] triacrylate, and a mixture of solvent comprising ethyl methyl carbonate and ethylene carbonate (in a molar ratio of 1:1) containing lithium bis(trifluoromethanesulfonimide) at a 1 molar concentration (available from Tomyama) in a volume fraction of 20% of the electrode. Said negative electrode has a capacity of 3.48 Coulomb/cm$^2$O/Li=30). The electrode is obtained by coating in a solvent phase (methoxyethane) on a copper current collector 16 $\mu$m thick so as to give a film 55 $\mu$m thick. The separator consists of a polymer membrane as described in the previous paragraph (polymer membrane 15 $\mu$m thick containing lithium bis(trifluoromethanesulfonimide) in a molar ratio O/Li=30). The positive electrode contains a mixture of 80.6 weight percent of iron phosphate, (LiFePO$_4$), 5.4 weight percent of Shawinigan carbon black and 15 weight percent of a polymer comprising glycerol- tri[poly(oxyethylene)(oxypropylene)] triacrylate, and a mixture of solvent comprising ethyl methyl carbonate and ethylene carbonate (in a molar ratio of 1:1) containing lithium bis(trifluoromethanesulfonimide) at a 1molar concentration (available from Tomyama) in a volume faction of 20% of the electrode. Said positive electrode has a capacity of 3.98 Coulomb/cm$^2$. The electrode is obtained by coating in solvent phase (methoxyethane) on an aluminum current collector 8 $\mu$m thick so as to give a film 49 $\mu$m thick. When assembling the electrochemical generator, the separator is immersed 30 minutes in a mixture of solvent comprising ethyl methyl carbonate and ethylene carbonate (in a molar ratio of 1:1) containing lithium bis(trifluoromethanesulfonimide) at a 1 molar concentration (available from Tomyama). Following the immersion, the solvent makes up for 42% of the volume of the separator. Depending on the different cross-linking rates between the polyether based matrix of the separator and the polyether matrices in the composite electrodes, the aprotic solvent is unequally distributed between the polyether matrices. The electrochemical generator is thereafter rapidly assembled at 25° C. by light pressing the negative electrode, the separator and the positive electrode and is thereafter placed in a sealed bag. After thirty-three cycles of deep discharge obtained at a constant discharge current Id of 0.15 mA/cm$^2$ and a charge current of 0.12 mA/cm$^2$, between voltage limits of 4.1 V and 2.7 V more than 80% of the capacity is always obtained

EXAMPLE 4

This example concerns the evaluation of the mechanical properties of the gels used as separator. Measurement of a mechanical property is obtained by an evaluation of the degree of penetration of a hemispherical tip in the separator. The measure is carried out by means of a hemispherical tip with a diameter of 7 mm and a load of 240 g at 25 or 60° C. on dried and gel membranes of 60±3 $\mu$m. All the membranes are cross-linked by UV.

Dried Membrane #1) glycerol-tri[poly(oxyethylene)(oxypropylene)] triacrylate (8000):

25° C.

0% solvent

13% penetration

Dried Membrane #2) glycerol-tri[poly(oxyethylene)(oxypropylene)] triacrylate (8000):

60° C.

0% solvent

24% penetration

Dried Membrane #4) glycerol-tri[poly(oxyethylene)(oxypropylene)] triacrylate (8000):

25° C.

63% in volume of tetraethyl sulfamide

37% penetration

Membrane #4) glycerol-tri[poly(oxyethylene)(oxypropylene)] triacrylate (8000)+ polyethylene oxidegylcol dimethacrylate in a volume fraction of 70% and 30% respectively:

25° C.

42% in volume of tetraethyl sulfamide

25% penetration

Membrane #5) glycerol-tri[poly(oxyethylene)(oxypropylene)] triacrylate (8000)+ trimethylolpropane triacrylate in a volume fraction of 70% and 30% respectively:

25° C.

39% in volume of tetraethyl sulfamide

23% penetration

This example is a good demonstration that gel membranes containing is a volume proportion of aprotic solvent of about 40% have mechanical properties at 25° C. which are comparable to those of a membrane without solvent used at 60° C. in a generator with dry electrolytic component.

EXAMPLE 5

The present example concerns an electrochemical generator containing an electrolytic component such as described in Example 3 except that the separator is prepared in the manner described in embodiment 6 to facilitate the working of the example in the laboratory.

All manipulations were carried out in a glove box under an inert and anhydrous atmosphere. A solution A is obtained by dissolving lithium hexafluorophosphate in glycerol-tri[poly(oxyethylene)(oxypropylene)] triacrylate is which the molecular weight is 8,000 so as to give a molar ratio of oxygen over lithium (O/Li) of 30/1. A solution B is obtained by adding trimethylolpropane triacrylate (available from Polyscience, USA) to solution A so as to obtain 85 volume percent of polymer and 15 volume percent of trimethylolpropane triacrylate in solution A.

Solution B is spread in the form of a film 15 $\mu$m thick and cross-linked by electron bean irradiation, EB, at 5 Mrad.

An electrochemical generator is manufactured by utilizing a negative electrode which contains 90 weight percent of graphite and 10 weight percent of a polymer comprising vinyldiene fluoride co-hexafluoro propene. Said positive electrode has a capacity of 3.54 Coulomb/cm². The electrode is obtained by coating in solvent phase (acetone) on a copper current collector 16 μm thick so as to obtain a film 56 μm thick. The separator consists of a polymer membrane as described in the previous paragraph (polymer membrane 15 μm thick containing lithium hexafluorophosphate in a molar ratio O/Li=30). The positive electrode contains a mixture of 91.6 weight percent of cobalt oxide, ($LiCoO_2$), 2.7 weight percent of Shawinigan carbon black and 5.7 weight percent of a polymer comprising vinyldiene fluoride co-hexafluoro propane. Said positive electrode has a capacity of 4.06 Coulomb/cm². The electrode is obtained by coating in solvent phase (acetone) on an aluminum current collector 8 μm thick so as to obtain a film 49 μm thick. When assembling the electrochemical generator, the separator is immersed for 30 minutes in a solvent mixture comprising ethyl methyl carbonate and ethylene carbonate (in a molar ratio 1:1) containing lithium hexafluorophosphate at a 1 molar concentration (available from Tomyama). Following the immersion, the solvent makes up for 41% of the volume of the separator. The cathode and the anode are soaked, so as to compensate for their porosity, with a solution C, said solution C containing 50 volume percent of a solvent mixture comprising ethyl methyl carbonate and ethylene carbonate (in a molar ratio 1:1) and lithium hexafluorophosphate at a 1 molar concentration (available from Tomyama) and 50 volume percent of a polymer comprising glycerol-tri[poly(oxyethylene)oxypropylene)] triacrylate. After soaking, the negative electrode and the positive electrode are irradiated with an electron bean, EB, at 5 Mrad so as to cross-link the glycerol-tri[poly(oxyethylene)oxypropylene)] triacrylate polymer. The copolymer of vinyldiene fluoride co-hexafluoro propene has a much less important affinity for the aprotic solvent than that of the polyethers for his sane aprotic solvent The solvent is therefore unequally distributed between the polyether matrices and the vinyldiene fluoride co-hexafluoro propene matrix. Moreover, the polyether matrix used to compensate for the porosity of the composite electrodes contains more aprotic solvent than the polyether matrix used as separator. The electrochemical generator is thereafter rapidly assembled by light pressing at 25° C. the negative electrode of the separator and the positive electrode and is placed in a sealed bag. After twenty-eight cycles of deep discharge obtained at a constant current discharge Id of 0.15 mA/cm² and a charge current of 0.12 mA/cm², between voltage limits of 4.1 V and 2.7 V, more than 80% of the capacity is always obtained.

EXAMPLE 6

The present example concerns an electrochemical generator including an electrolytic component as described in embodiment 3 by utilizing a manufacturing process as described in embodiment 7 except that the composite electrodes are prepared under an inert atmosphere.

All manipulations were carried out in a glove box under an inert and anhydrous atmosphere. A solution A is obtained by mixing 50 volume percent of a solvent comprising ethyl methyl carbonate and ethylene carbonate (in a molar ratio 1:1), and lithium hexafluorophosphate at a 1 molar concentration (solvent available from Tomyama) with 50 volume percent of a polymer comprising glycerol tri[poly(oxyethylene)(oxypropylene)] triacrylate.

An electrochemical generator is manufactured by utilizing a negative electrode which contains 89 weight percent of graphite and 11 weight percent of a polymer comprising vinyldiene fluoride co-hexafluoro propene. Said negative electrode has a capacity of 1.90 Coulomb/cm². The electrode is obtained by coating in solvent phase (acetone) on a copper current collector 16 μm thick so as to give a film 30 μm thick. The positive electrode contains a mixture of 86.1 weight percent of iron phosphate, (LiFePO4), 5.8 weight percent of Shawinigan carbon black and 8.1 weight percent of a polymer comprising vinyldiene fluoride co-hexafluoro propene. Said positive electrode has a capacity of 2.12 Coulomb/cm². The electrode is obtained by coating in solvent phase (acetone) on an aluminum current collector 8 μm thick so as to obtain a film 42 μm thick. Said solution A is spread on the anode and the cathode so as to compensate for the porosity of these two electrodes and leave an excess between 5 and 10 μm of solution A at the surface of the electrodes so as to constitute a portion of the separator. Immediately after spreading, the negative electrode and the positive electrode are irradiated by an electron beam, EB, at 5 Mrad so as to cross-link the polymer comprising a glycerol-tri[poly(oxyethylene)oxypropylene)] triacrylate. The aprotic solvent happens to be unequally distributed between the polyether matrix and the matrix comprising vinyldiene fluoride co-hexafluoro propene. The electrochemical generator is then rapidly assembled by light pressing, at 25° C., the negative electrode and the positive electrode and is placed in a sealed bag. After thirty-eight cycles of deep discharge obtained at a constant discharge current Id of 0.09 mA/cm² and a charge current of 0.08 mA/cm², between voltage limits of 4.1 V and 2.7 V, more than 70% capacity is always obtained.

EXAMPLE 7

The present example concerns an electrochemical generator including an electrolytic component as described in preferred embodiments 1 and 4 except that the separator is prepared in the manner described in embodiment 6 to facilitate the working of the example in the laboratory.

All manipulations were carried out in a glove box under an inert and anhydrous atmosphere. A solution A is obtained by dissolving lithium hexafluorophosphate in glycerol-tri[poly(oxyethylene)(oxypropylene)] triacrylate in which the molecular weight is 8,000 so as to give a molar ratio of oxygen over 10 lithium (O/Li) of 30/1. A solution B is obtained by adding to solution A trimethylolpropane triacrylate (available from Polyscience, USA) so as to obtain 85 volume percent of polymer in solution A and 15 volume percent of trimethylolpropane triacrylate.

Solution B is spread in the form of film 15 μm thick and cross-linked is by electron beam irradiation, EB, at 5 Mrad.

An electrochemical generator is manufactured by utilizing a negative electrode which contains 90 weight percent of graphite, 10 weight percent of a polymer comprising glycerol-tri[poly(oxyethylene)(oxypropylene)] triacrylate, and a solvent mixture comprising ethyl methyl carbonate and ethylene carbonate (in a molar ratio 1:1) containing lithium hexafluorophosphate at a 1 molar concentration (available from Tomyama) in a 20% volume fraction of the electrode. Said negative electrode has a capacity of 3.48 Coulomb/cm². The electrode is obtained by coating in solvent phase (methoxyethane) on a copper current collector 16 μm tick so as to give a film 55 μm thick. The separator consists of a polymer membrane such as described in the previous paragraph polymer membrane with a thickness of 15 μm containing lithium hexafluorophosphate in a molar ratio O/Li=30). The positive electrode contains a 91.6 weight percent mixture of cobalt oxide, ($LiCoO_2$), 2.7 weight percent of Shawinigan carbon black and 5.7 weight percent of a polymer comprising vinyldiene fluoride co-hexafluoro propene. Said positive electrode has a capacity of 4.05 Coulomb/cm². The electrode is obtained by coating in solvent phase (acetone) on an aluminum current collector 8 μm thick so as to give a film 48 μm thick. When assembling the electrochemical generator, the separator is immersed 30 minutes in a solvent mixture comprising ethyl methyl carbonate and ethylene carbonate (in a molar ratio 1:1) containing lithium hexafluorophosphate at a 1 molar concentration (available from Tomyama). The cathode is immersed 10 minutes in a solution of the solvent mixture comprising ethyl methyl carbonate and ethylene carbonate (in a molar ratio 1:1) containing lithium hexafluorophosphate at a 1 molar concentration (available from Tomyama).

Following this immersion, the solvent makes up for 44% of the volume of the separator and 51% of the volume of the cathode. The vinyldiene fluoride co-hexafluoro propene copolymer has a much less important affinity for the aprotic solvent than hat of polyethers for this same aprotic solvent. The solvent happens to be unequally distributed between the polyether matrix in the anode, the polyether matrix of the separator and the vinyldiene fluoride co-hexafluoro propane matrix. The electrochemical generator is thereafter rapidly assembled by light pressing at 25° C., of the negative electrode of the separator and the positive electrode and is placed is a sealed bag. After forty-three cycles of deep discharge obtained at a constant discharge current Id of 0.15 mA/cm² and a charge current of 0.12 mA/cm², between voltage limits of 4.1 V and 2.7 V, more than 80% of the capacity is always obtained.

EXAMPLE 8

The present example concerns an electrochemical generator including an electrolytic component as described in embodiment 3 utilizing a manufacturing process as described in embodiment 10 except that the composite electrodes are prepared under inert atmosphere.

All manipulations were carried out in a glove box under an inert and anhydrous atmosphere. A solution A is obtained by dissolving lithium hexafluorophosphate in glycerol-tri [poly(oxyethylene)(oxypropylene)] triacrylate of molecular weight 8,000 so as to give a molar ratio of oxygen over lithium (O/Li) of 30/1. A solution B is obtained by adding to solution A lithium aluminate in a volume fraction of 10% versus the polymer comprising glycerol tri[poly (oxyethylene)(oxypropylene)] triacrylate and a diluent comprising dimethoxyethane in a volume fraction of 50%.

Solution B is spread in the form of a film 8 μm thick and, after evaporating the diluent, is cross-linked by electron beam irradiation, EB, at 5 Mrad so as to give a charged separator.

A solution C is obtained by mixing a solvent comprising ethyl methyl carbonate and ethylene carbonate (in a molar ratio 1:1) and 50 volume percent of lithium hexafluorophosphate at a 1 molar concentration (solvent available from Tomyama) with 50 volume percent of a polymer comprising glycerol tri[poly(oxyethylene)(oxypropylene)].

An electrochemical generator is manufactured by utilizing a negative electrode which contains 90 weight percent of graphite and 10 weight percent of a polymer comprising vinyldiene fluoride co-hexafluoro propene. Said positive electrode has a capacity of 3.52 Coulomb/cm². The electrode is obtained by coating in solvent phase (acetone) on a copper current collector 16 μm thick so as to give a film 56 μm thick. The positive electrode contains 91.6 weight percent of cobalt oxide, (LiCoO₂), 2.7 weight percent of Shawinigan carbon black and 5.7 weight percent of a polymer comprising vinyldiene fluoride co-hexafluoro propene. Said positive electrode has a capacity of 4.11 Coulomb/cm². The electrode is obtained by coating in solvent phase (acetone) an aluminum current collector 8 μm thick so as to give a film 49 μm thick. Said solution C is spread on the anode and the cathode so as to compensate for the porosity of these two electrodes and leave in excess between 2 and 5 μm of solution C at the surface of the electrodes so as to constitute a portion of the separator. Immediately after spreading, the negative electrode and the positive electrode are irradiated by an electron beam, EB, at 5 Mrad so as to cross-link the polymer comprising glycerol tri[poly(oxyethylene)(oxypropylene)] triacrylate. The aprotic solvent happens to be unequally distributed between the polymer matrices in the composite electrodes, the polyether matrix loaded with lithium aluminate constituting a portion of the separator and the vinyldiene fluoride co-hexafluoro propene matrix. The electrochemical generator is thereafter rapidly assembled by light pressing at 25° C. of the negative electrode, the charged separator as described previously and the positive electrode and is placed in a scaled bag. After fifty-two cycles of deep discharge obtained at a constant discharge current Id of 0.1 5 mA/cm² and a charge current of 0.12 mA/cm², between voltage limits of 4.1 V and 2.7 V, more than 80% of the capacity is always obtained.

EXAMPLE 9

The present example concerns an electrochemical generator including an electrolytic component as described in embodiment 1 except that the separator is prepared in the manner descibed in Embodiment 6 to facilitate the working of the example in the laboratory.

All manipulations were carried out in a glove box under an inert and anhydrous atmosphere. A solution A is obtained by adding 4.4 g of lithium tetrafluoroborate to glycerol-tri [poly(oxyethylene)oxypropylene)] triacrylate of molecular weight 8,000 so as to give a molar ratio of oxygen over lithium (O/Li) of 30/1. A solution B is obtained by adding 11.3 g of lithium tetrafluoroborate in 52.1 g of commercial polyethylene oxide glycol dimethacrylate of molecular weight 200 (available from Polyscience) so as to give a molar ratio of oxygen over lithium (O/Li) of 30/1. A solution C is obtained by mixing a proportion of each of solutions A and B. The proportion of solutions A and B is adjusted so as to obtain in solution C 70 volume percent of the polymer of solution A and 30% of the polymer of solution B. 1 weight percent (polymer weights) of a photoinitiator consisting of Irgacure-651® (Ciba Geigy) is added.

Solution C is spread in the form of film 20 μm thick and is cross-linked by UV radiation during 2 minutes at a power of 14.6 mW/cm² (UVA).

An electrochemical generator is manufactured by utilizing a negative electrode of metallic lithium 30 μm thick, which is laminated on a current collector of nickel 8 μm. The separator consists in a polymer membrane such as described in the preceding paragraph (polymer membrane with a thickness of 20 μm containing lithium tetrafluoroborate in a molar ratio O/Li=30). The positive electrode contains a mixture of a weight fraction of 91.6 weight percent of cobalt oxide, (LiCoO₂), 2.7 weight percent of Shawinigan carbon black aid 5.7 weight percent of a polymer comprising vinyldiene fluoride co-hexafluoro propene. Said positive electrode has a capacity of 4.07 Coulomb/cm². The electrode is obtained by coating in solvent phase (acetone) on an aluminum current collector 8 μm thick so as to give a film 49 μm thick. When assembling the electrochemical generator, the separator is immersed 30 minutes in a solvent mixture comprising propylene carbonate and ethylene carbonate (in volume proportions of 60% and 40% respectively) and the cathode is immersed 10 minutes in a solution of the mixture of solvents comprising propylene carbonate and ethylene carbonate (in volume proportions of 60% and 40% respectively) containing lithium tetrafluoroborate at a concentration of 0.31 mol/Kg. The vinyldiene fluoride co-hexafluoro propene copolymer has a much less important affinity for the aprotic solvent than that of polyether for this same aprotic solvent. The solvent is therefore unequally distributed between the polyether matrix and the vinyldiene fluoride co-hexafluoro propene. However, in the composite electrode, the aprotic solvent thus compensates for the porosity of the electrode in addition to gel the vinyldiene fluoride co-hexafluoro propene copolymer. Therefore, following the immersion, the solvent takes up 41% of the volume of the separator and 61% of the volume of the cathode. The electrochemical generator is thereafter rapidly assembled by light pressing at 25° C. of the negative electrode of the separator and the positive electrode and is placed in a sealed bag. After fifty cycles of deep discharge obtained at a constant discharge current Id of 0.13 mA/cm$^2$ and a charge current of 0.13 mA/cm$^2$, between voltage limits of 4.2 V and 2.5 V, more than 50% of the capacity is always obtained.

EXAMPLE 10

The present example concerns an electrochemical generator including an electrolytic component such as described in embodiment 1 except that the separator is prepared in the manner described in embodiment 6 to facilitate the working of the example in the laboratory.

All handlings were carried out in a glove box under an inert and anhydrous atmosphere. A solution A is obtained by adding 4.4 g of lithium tetrafluoroborate to 21.2 g of glycerol-tri[poly(oxyethylene)(oxypropylene)] triacrylate of molecular weight 8,000 so as to give a molar ratio of oxygen over lithium (O/Li) of 30/1. A solution B is obtained by adding 11.3 g of lithium tetrafluoroborate in 52.1 g of commercial polyethylene oxide glycol dimethacrylate of molecular weight 200 (available from Polyscience, USA) so as to give a molar ratio of oxygen over lithium (O/Li) of 30/1. A solution C is obtained by mixing a portion of each solution A and B. The proportions of solutions A and B are adjusted so as to obtain in solution C a volume proportion of polymer of solution A of 70% and of polymer from solution B of 30%. 1 weight percent (polymer weight) of a photoinitiator comprising Irgacure-651® (Ciba Geigy) is added.

Solution C is spread in the form of a film 20 μm thick and cross-linked by UV radiation during 2 minutes at a power of 14.6 mW/cm$^2$ (UVA).

An electrochemical generator is manufactured by utilizing a negative electrode of metallic lithium 30 μm thick, which is laminated on a nickel current collector 8 μm thick. The separator consists of a polymer membrane as described in the previous paragraph (polymer membrane with a thickness of 20 containing lithium tetrafluoroborate in a molar ratio O/Li=30). The positive electrode contains 91.6 weight percent of cobalt oxide, (LiCoO$_2$), 2.7 weight percent of Shawinigan carbon black and 5.7 weight percent of a polymer comprising vinyldiene fluoride-co-hexafluoropropene. Said positive electrode has a capacity of 4.07 Coulomb/cm$^2$. The electrode is obtained by coating in solvent phase (acetone) on an aluminum current collector 8 μm tick so as to give a film 49 μm thick. When assembling the electrochemical generator, the separator is immersed 30 minutes in a solvent comprising tetraethyl sulfamide and the cathode is immersed 10 minutes in a solution of tetraethyl sulfamide containing lithium tetrafluoroborate at a concentration of 0.31 mol/Kg. The copolymer of vinyldiene fluoride co-hexafluoro propene has a much less important affinity for the aprotic solvent than that of polyether for this same aprotic solvent. The solvent is therefore unequally distributed between the polyether matrix and the vinyldiene fluoride co-hexafluoro propene matrix. However, in the composite electrode, the aprotic solvent also compensates for the porosity of the electrode in addition to gel the polymer of vinyldiene fluoride co-hexafluoro propene. Therefore, following the immersion, tetraethyl sulfamide takes up 36% of the volume of the separator and 1% of the volume of the cathode. The electrochemical generator is thereafter rapidly assembled by pressing at 25° C. the negative electrode of the separator and the positive electrode and is placed in a sealed bag. After eleven cycles of deep discharge obtained at a constant discharge current Id of 13 μA/cm$^2$ and a charge current of 13 μA/cm$^2$, between voltage limits of 4.2 V and 2.5 V, more than 61% of the capacity is always obtained.

EXAMPLE 11

The present example concerns an electrochemical generator including an electrolytic component such as described in embodiment 1 except that the separator is prepared in the manner described in embodiment 6 to facilitate the working of the example in the laboratory.

All handlings were carried out in a glove box under an inert and anhydrous atmosphere. A solution A is obtained by dissolving lithium tetrafluoroborate in glycerol-tri[poly (oxyethylene)(oxypropylene)] triacrylate in which the molecular weight is 8,000 so as to give a molar ratio of oxygen over lithium (O/Li) of 30/1. A solution B is obtained by adding to solution A trimethylolpropane triacrylate (available from Polyscience, USA) so as to give 85 volume percent of polymer in solution A and 15 volume percent of trimethylolpropane triacrylates.

Solution B is spread in the form of a film 15 μm thick and cross-linked by electron beam irradiation, EB, at 5 Mrad.

An electrochemical generator is manufactured by utilizing a negative electrode of metallic lithium 27 μm thick, which is laminated on a nickel current collector 8 μm thick. The separator consists of a polymer membrane such as described in the previous paragraph (polymer membrane with a thickness of 15 μm containing lithium tetrafluoroborate in a molar ratio O/Li=30). The positive electrode contains a mixture of 89.1 weight percent of manganese oxide, (MnO$_2$) 2.6 weight percent of Shawinigan carbon black and 8.3 weight percent of a polymer comprising vinyldiene fluoride co-hexafluoro propene. Said positive electrode has a capacity of 4.10 Coulomb/cm$^2$. The electrode is obtained by coating in solvent phase (acetone) on an aluminum current collector 8 μm thick so as to give a film 54 μm thick. When assembling the electrochemical generator, the separator is immersed 30 minutes in a mixture of solvents comprising γ-butyrolactone and carbonate (in a molar ratio 1:1) containing lithium tetrafluoroborate at a 1 molar concentration. The copolymer of vinyldiene fluoride co-hexafluoro propene has a much less important affinity for the aprotic solvent than that of the polyether for the same aprotic solvent. The solvent is therefore unequally distributed between the polyether matrix and the vinyldiene fluoride co-hexafluoro propene matrix. However, in the composite electrode, the aprotic solvent also compensates for the porosity of the electrode in addition to gelling the copolymer of vinyldiene fluoride co-hexafluoro propene. Therefore, following the immersion, the solvent takes up 45% of the volume of the separator. The cathode is also soaked, so as to fill its porosity, with a solution C, said solution C containing 50 volume % of a mixture of solvents comprising γ-butyrolactone and carbonate (in a molar ratio 1:1) containing lithium tetrafluoroborate at a 1 molar concentration and 50 volume % of the polymer comprising glycerol tri[poly(oxyethylene)(oxypropylene)] triacrylate. After having been soaked, the positive electrode is irradiated with an electron beam, EB, at 5 Mrad so as to cross-link the glycerol-tri[poly(oxyethylene)(oxypropylene)] triacrylate polymer. The electrochemical generator is thereafter rapidly assembled by light pressing at 25° C. of the negative electrode of the separator and the positive electrode and is placed in a sealed bag. The generator is treated with a single deep discharge at a discharge current Id of 0.19 mA/cm$^2$ between voltage limits of 3.2 V to 2.0 V.

EXAMPLE 12

The present example concerns an electrochemical generator including an electrolytic component such as described in embodiment 1 except that the separator is prepared in the manner descibed in embodiment 6 to facilitate the working of the example in the laboratory.

All handlings were carried out in a glove box under an inert and anhydrous atmosphere. 367 g of a terpolymer of ethylene oxide, methylglycidylether and allylglycidylether and 82 g of lithium bis(trifluoromethanesulfonimide) are added to 1,638 ml of acetonitrile. The concentration of the salt and of the terpolymer is adjusted so as to give a molar ratio of oxygen over lithium (O/Li) of 30/1.

To 20.0 ml of this mother solution, there is added 0.90 ml of a solution obtained by dissolving 4,5 g of lithium bis (trifluoromethanesulfonimide) in 20.9 g of glycerol-tri[poly (oxyethylene)(oxypropylene)] triacrylate of molecular weight 8,000. The mixture of these two solutions is then stirred at room temperature during about 12 hours. 2 weight % of benzoyl peroxide with respect to the weight of the polymers is added and the solution is again stirred during 90 minutes.

After having spread the solution in the form of film 20 μm thick, the material is heated under an inert atmosphere at 85° C. during 24 hours.

An electrochemical generator is manufactured by utilizing a negative electrode of metallic lithium 30 μm thick, which is laminated on a nickel current collector 8 μm thick. The separator consists of a polymer membrane such as described in the previous paragraph (polymer membrane with a thickness of 20 μm containing lithium bis (trifluoromethanesulfonimide) in a molar ratio O/Li=30). The positive electrode contains a mixture of 90.0 weight percent of sulfur dioxide (TiS$_2$), 3.6 weight percent of Shawinigan carbon black and 6.4 weight percent of a terpolymer comprising poly(ethylene propylene diene) (EPDM). Said positive electrode has a capacity of 1 Coulomb/cm$^2$. The electrode is obtained by coating in solvent phase (cyclohexane) on an aluminum current collector 8 μm thick so as to give a film 15 μm thick. When assembling the electrochemical generator, there is added in the electrolyte tetraethyl sulfamide in a molar ratio tetraethyl sulfamide/lithium bis(trifluoromethanesulfonimide) equal to 1(tetraethyl sulfamide/Li=1). The electrochemical generator is thereafter rapidly assembled by pressing at 25° C. under vacuum of the negative electrode of the separator and the positive electrode. The cycling results at 25° C., presented in FIG. 3, show a normal cycling of the generator from the point of view of capacity and efficiency (defined as the ratio of discharge over the subsequent charge) for more than 500 cycles, 100% corresponding to a capacity of 1 Coulomb/cm$^2$ of the positive. The cycles of deep discharges were obtained at a constant discharge current Id of 23 μA/cm$^2$ and a charge current of 18 μA/cm$^2$, between voltage limits of 2.7 V and 1.7 V.

What is claimed is:

1. An electrolytic component for an electrochemical generator comprising a first polymer matrix and a second polymer matrix, wherein said first polymer matrix comprises a polyether, at least one first polar aprotic solvent and at least one alkali metal salt, said first polar aprotic solvent causing said polyether to swell to provide a first gel, said second polymer matrix comprises a second polymer, at least one second polar aprotic solvent and at least one alkali metal salt, said second polar aprotic solvent causing said second polymer to swell to provide a second gel, said first and second polymer matrices are disposed in contact with each other, said first and second polar aprotic solvents are unequally distributed between said first and second polymer matrices, thereby providing a macroscopic separation between said first and said second matrices.

2. The electrolytic component of claim 1, wherein said polyether has an amount of cross-linking which is different from that of said second polymer, thereby providing an unequal distribution of said first and second polar aprotic solvents between said first and said second polymer matrices.

3. The electrolytic component of claim 1, wherein at least one of the polymer matrices contains a solid filler, thereby providing an unequal distribution of said first and second aprotic solvents between said first and said second polymer matrices.

4. The electrolytic component of claim 1, wherein said first polar aprotic solvent has a different affinity toward said polyether than the second polar aprotic solvent has towards said second polymer, thereby providing an unequal distribution of said first and second polar aprotic solvents between said first and said second polymer matrices.

5. The electrolytic component of claim 1, wherein said polyether and said second polymer provide an unequal distribution of the first and second polar aprotic solvents between said first and said second polymer matrices.

6. The electrolytic component of claim 1, wherein at least one of said first and said second polymer matrices is only slightly swollen by said first or said second aprotic solvent.

7. The electrolytic component of claim 1, wherein the amount of swelling of the first polymer matrix is less than the amount of swelling of the second polymer matrix.

8. The electrolytic component of claim 1, wherein the first polymer matrix further comprises a mixture of a cross-linkable polyether and at least one other polyether or polyether-based oligomer, and said at least one other polyether or polyether-based oligomer has polyfunctional cross-linkable chemical groups capable of providing an interpenetrating network after cross-linking.

9. The electrolytic component of claim 1, wherein the first matrix further comprises a mixture of a non-cross-linkable polyether and at least one other polyether or polyether-based oligomer, and said at least one other polyether or polyether-based oligomer has polyfunctional cross-linkable chemical groups capable of providing a semi interpenetrating network after cross-linking.

10. The electrolytic component of claim 1, wherein the first polymer matrix further comprises a mixture of a cross-linkable polyether and at least one cross-linking additive.

11. The electrolytic component of claim 10, wherein the cross-linking additive is selected from the group consisting of trimethylolpropane triacrylate, trimethylolpropane trimethacrylate, polyethylene oxide diacrylate, polyethylene oxide dimethacrylate, glycerol triacrylate, glycerol trimethacrylate, pentaerythiol tetraacrylate, dipentaerythiol penta/hexaacrylate, di(trimethylolpropane) tetraacrylate, and mixtures thereof.

12. The electrolytic component of claim 1, wherein one of said first and said second polymer matrices is cross-linked.

13. The electrolytic component of claim 1, wherein the polymer matrices comprise at least one polymer, oligomer, or monomer including multidimensional cross-linkable chemical groups enabling to obtain an interpenetrated network in physical contact with the two matrices, thereby maintaining and/or improving adhesion between the first and second polymer matrices.

14. The electrolytic component of claim 1, further comprising at least one polymer or non-cross-linkable oligomer in physical contact with the first and second polymer matrices, wherein said at least one polymer or non-cross-linkable oligomer has polar groups capable of interacting with said first and second polymer matrices, thereby maintaining and/or improving adhesion between the first and second polymer matrices.

15. The electrolytic component of claim 1, wherein at least a fraction of anionic groups of said first or second alkali metal salt are fixed on at least one of the first and second polymer matrices.

16. The electrolytic component of claim 1, wherein the first polymer matrix further comprises a non-cross-linkable and swellable polyether.

17. The electrolytic component of claim 1, wherein the first polyether matrix further comprises a cross-linkable polyether.

18. The electrolytic component of claim 1, wherein the second polymer is selected from the group of polymers consisting of polyvinylidene-co-hexafluoropropene, polyvinylidene fluoride (PVDF), polyacrylonitrile (PAN), poly (methylmethacrylate) (PMMA), poly(ethylene propylene diene) (EPDM), and a second polyether.

19. The electrolytic component of claim 18, wherein the second polyether absorbs an amount of polar aprotic solvent which is different from the amount of polar aprotic solvent absorbed by the polyether of the first polymer matrix.

20. The electrolytic component of claim 1, wherein the first and second polar aprotic solvents are selected from the group consisting of propylene carbonate, ethylene carbonate, tetrahydrofuran, 2-methyltetrahydrofurane, 1,3-dioxolane, 4,4-dimethyl-1,3-dioxolane, γ-butyrolactone, butylene carbonate, sulfolane, 3-methylsulfolane, tert-butyl-ether, 1,2-dimethoxyethane, 1,2-diethoxyethane, bis (methoxyethyl)ether, 1,2-ethoxymethoxyethane, tertbutylmethylether, glymes and sulfamides of formula: $R_1R_2N-SO_2-NR_3R_4$, in which $R_1$, $R_2$, $R_3$ and $R_4$ are each independently $C_{1-6}$ alkyl groups or $C_{1-6}$ oxyalkyl groups.

21. An electrochemical generator comprising:
a negative electrode,
a positive electrode, and
a polymer electrolyte separator,
wherein said electrodes are reversible to alkali ions,
wherein said polymer electrolyte separator comprises a first polymer matrix comprising a polyether, at least one first polar aprotic solvent and at least one alkali metal salt, said first polar aprotic solvent causing said polyether to swell to provide a first gel,
at least one of said negative and said positive electrodes is a composite electrode comprising an active electrode material and a second polymer matrix comprising a second polymer, at least one second polar aprotic solvent and at least one alkali metal salt, said second polar aprotic solvent causing said second polymer to swell to provide a second gel,
said first and second polymer matrices are disposed in contact with each other,
and said first and second polar aprotic solvent are unequally distributed between said first and second polymer matrices, thereby providing a macroscopic separation between said first and said second polymer matrices.

22. The electrochemical generator of claim 21, wherein a polymer matrix in contact with the positive electrode is electrochemically stable in the presence of the positive electrode.

23. The electrochemical generator of claims 22, wherein a polymer matrix in contact with the negative electrode is electrochemically stable in the presence of the negative electrode.

24. The electrochemical generator of claim 21, wherein said alkali metal salt comprises at least one lithium salt.

25. The electrochemical generator of claim 21, wherein the negative electrode comprises metallic lithium.

26. The electrochemical generator of claim 21, wherein said positive and said negative electrodes are composite electrodes comprising insertion materials which are reversible to lithium.

27. The electrochemical generator of claim 21, wherein the negative electrode is a carbon composite.

28. The electrochemical generator of claim 27, wherein the negative electrode is a carbon composite having a binder comprising a polyether based polymer matrix.

29. The electrochemical generator of claim 21, wherein said first polymer matrix is present at least in said separator and said second polymer matrix is present exclusively in said composite electrode.

30. The electrochemical generator of claim 21, wherein said first polymer matrix is exclusively present in said separator and said second polymer matrix is present in said composite electrode, whereby said macroscopic separation is between the composite electrode and the separator.

31. The electrochemical generator of claim 21, wherein the first polymer matrix is also present in said composite electrode, and the second polymer matrix is mixed with the active electrode material, thereby localizing the macroscopic separation in said composite electrode.

32. The electrochemical generator of claim 21, wherein the second polymer matrix is slightly swollen, and said composite electrode has a porosity which is compensated by said second polar aprotic solvent.

33. The electrochemical generator of claim 21, wherein the positive electrode is partially or totally coated with at least one of said first and second polymer matrices.

34. The electrochemical generator of claim 21, wherein the negative electrode is partially or totally coated with at least one of said first and second polymer matrices.

* * * * *

UNITED STATES PATENT AND TRADEMARK OFFICE
CERTIFICATE OF CORRECTION

PATENT NO.    : 6,280,882 B1                                              Page 1 of 1
DATED         : August 28, 2001
INVENTOR(S)   : Vallee et al.

It is certified that error appears in the above-identified patent and that said Letters Patent is hereby corrected as shown below:

<u>Title page,</u>
Item [73], the Assignees should read:

-- [73]  Assignees: Hydro-Quebec, Montreal (CA);
                   Centre National de la Recherche Scientifique,
                   Paris (FR) --

Signed and Sealed this

Fourth Day of June, 2002

*Attest:*

*Attesting Officer*

JAMES E. ROGAN
*Director of the United States Patent and Trademark Office*